UNITED STATES PATENT OFFICE.

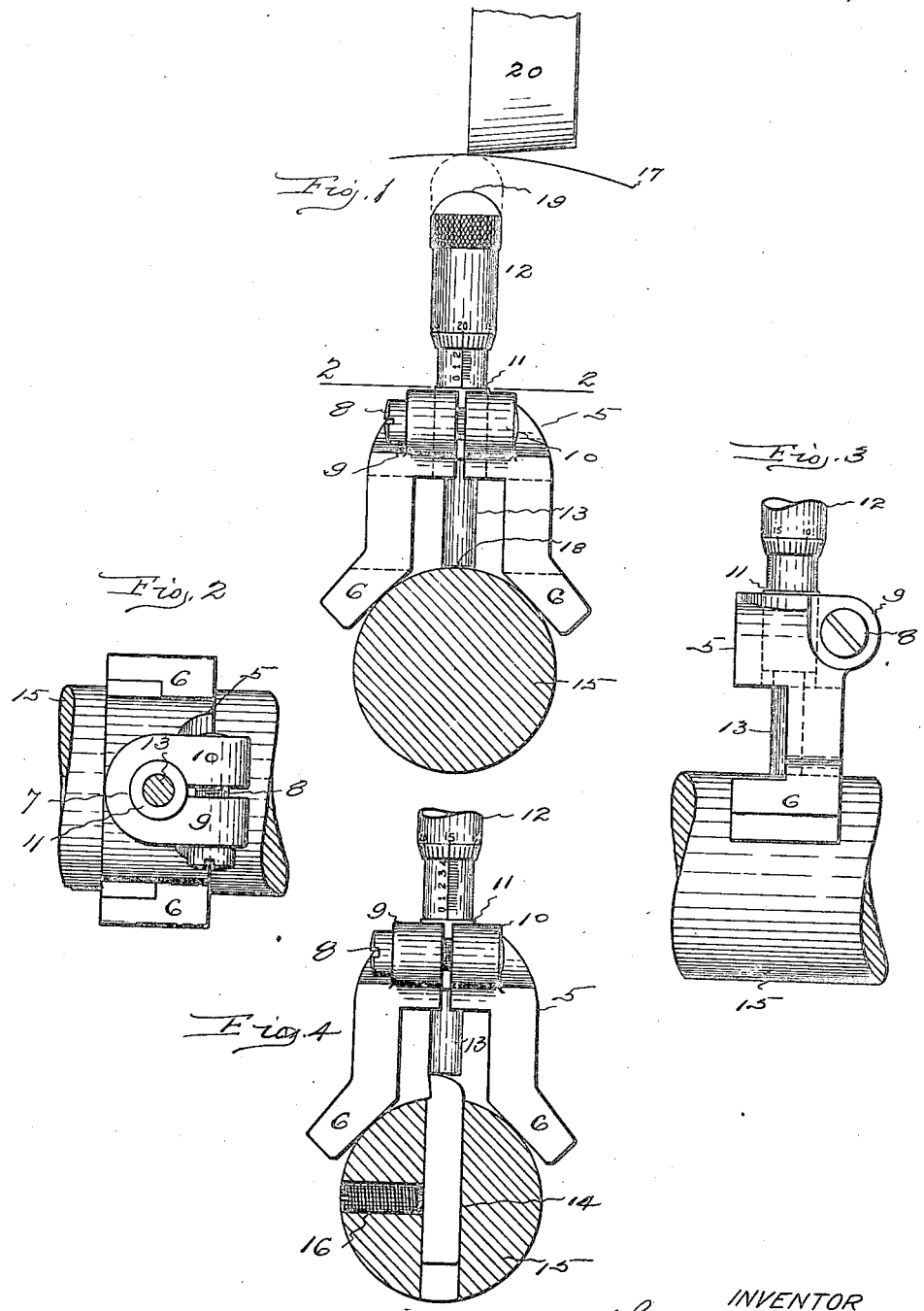

SHUBEL A. FOSTER, OF HARTFORD, CONNECTICUT.

MICROMETER GAUGE.

1,416,810.  Specification of Letters Patent.  Patented May 23, 1922.

Application filed December 27, 1920. Serial No. 433,169.

*To all whom it may concern:*

Be it known that I, SHUBEL A. FOSTER, a citizen of the United States, residing at Hartford, in the county of Hartford and State of Connecticut, have invented a new and useful Improvement in Micrometer Gauges, of which the following is a specification.

This invention relates to those micrometers which are designed to measure the difference between two surfaces, for instance, the amount of extension of a tool from its holder.

The object of the invention is to provide a simple and cheap gauge of this class by means of which boring blades or the like tools can be quickly set in boring bars or other holders to the exact degree necessary to insure the boring or cutting of a hole or cavity to an accurate predetermined dimension.

This invention is illustrated in the accompanying drawings as used for gauging the blade of a boring bar, also for setting a turning tool. Fig. 1 shows a side elevation of the gauge being used to take the preliminary reading of the micrometer on the boring bar, and indicating how it may be used to set a cutter for exterior turning. Fig. 2 is a view looking down from the line 2—2 on Fig. 1. Fig. 3 shows an edge view of the gauge on the boring bar. Fig. 4 shows a side view of the gauge when used in determining the amount of projection of a blade from the boring bar necessary to bore the required hole.

The head 5 of the instrument is made in the form of a fork with two obliquely extending feet 6. The head has a cylindrical opening 7 through its end and it is slitted from one side to this opening. A binding screw 8 is turned through one ear 9 and threaded into the other ear 10 for contracting the opening through the end of the head. The barrel 11 of a micrometer 12 of common construction is set in the opening in the end of the head and clamped therein by tightening the binding screw, so that the measuring pin 13 of the micrometer may be advanced into or retracted from the space between the limbs of the fork.

In using this device for setting a boring blade 14 in a bar 15 the exact diameter of the bar, if not known, is first ascertained by calipering in the usual manner. A reading of the micrometer scale of the instrument which forms the subject of this invention is obtained with the feet and measuring pin upon the bar as illustrated in Fig. 1, then the micrometer measuring pin is retracted a distance equal to one-half the difference between the diameter of the boring bar and the diameter of the hole to be bored  With the gauge thus set it is applied to the bar and the blade pushed out until its cutting end engages with the end of the measuring pin as illustrated in Fig. 4, in which position the blade is clamped by the screw 16. A blade can be quickly set in a boring bar in the manner described so that a hole of the exact desired dimension will be bored.

When it is desired to set a tool for turning a curved surface that is to be a given distance from the axis of an arbor or from a surface which has been turned, for instance turning a surface represented by the arc 17, the feet are placed on the arbor or turned surface and the reading taken as above described, then, the length from the inner end 18 of the measuring pin to the outer end of the head 19 being known and always being the same, the measuring pin is turned out to add to this length the amount necessary to complete the radius of the surface to be cut. When the instrument is thus adjusted the tool 20 is set with its cutting edge against the end of the head.

The invention claimed is:

1. A head for a micrometer gauge having a fork with outwardly inclined surfaces at the ends of the fork, a cylindrical perforation through the end of the head with a slit through the side of the head to said perforation, and a binding screw extending across the slitted portion of the head.

2. A gauge comprising a forked head with obliquely extending feet at the ends of the furcations, said head having a cylindrical axial perforation and a slit through one side of the perforation, a binding screw extending across the slitted portion at one side of the axis of the head and adapted to contract the perforation through the head, and a micrometer gauge barrel bearing a measuring pin adjustably fitted into the perforation and adapted to be clamped therein by said binding screw.

3. A gauge comprising a forked head, the furcations of said head having their inner walls parallel for a portion of the distance and diverging for the remainder of the distance with an opening through the head to the space between the forked limbs, and a micrometer gauge barrel bearing a measuring pin clamped in the head with the measuring pin in position to be advanced and retracted between the limbs of the fork.

SHUBEL A. FOSTER.